US005632360A

United States Patent [19]

Melara

[11] Patent Number: 5,632,360
[45] Date of Patent: May 27, 1997

[54] BRAKING DEVICE FOR A SELF-ORIENTATABLE TWIN-WHEEL

[75] Inventor: Francescantonio Melara, Bologna, Italy

[73] Assignee: Emilsider Meccanica S.p.A., Cadriano Di Granarolo Emilia, Italy

[21] Appl. No.: 331,827

[22] Filed: Oct. 31, 1994

[30] Foreign Application Priority Data

Nov. 3, 1993 [IT] Italy ................... B093A0436

[51] Int. Cl.⁶ ................................................ B60B 33/00
[52] U.S. Cl. .......................................... 188/1.12; 16/35 R
[58] Field of Search ..................... 188/1.12, 69; 16/35 R

[56] References Cited

U.S. PATENT DOCUMENTS

| 4,333,207 | 6/1982 | Atwood. | |
|---|---|---|---|
| 4,911,269 | 3/1990 | Perl. | |
| 5,368,133 | 11/1994 | Yang | 188/1.12 |
| 5,371,921 | 12/1994 | Roe | 16/35 R |

FOREIGN PATENT DOCUMENTS

| 4142484 | 6/1993 | Germany | 16/35 R |
|---|---|---|---|
| 2151470 | 7/1985 | United Kingdom. | |
| 2166046 | 4/1986 | United Kingdom. | |

Primary Examiner—Robert J. Oberleitner
Assistant Examiner—Chris Schwartz
Attorney, Agent, or Firm—Guido Modiano; Albert Josif

[57] ABSTRACT

Braking device for a self-orientating twin castor composed of two wheels which are rotatably mounted at the opposite ends of a spindle that is driven through a seat of a support which is composed of a vertical wall that lies between the wheels and in which a cylindrical recess is formed with a vertical axis that is eccentric with respect to the spindle. The recess is open in an upward region for the engagement of a pivot for mounting the castor in a piece of furniture, and a lever element is provided which can be coupled to the wall so that it can oscillate between two positions about an axis that is parallel to the spindle. The lever element includes an arm for blocking the wheels, which lies between the wheels, and an actuation arm, which can be accessed by a user. A retention structure is furthermore provided for retaining the lever element in the two positions, while the blocking arm is suitable to block the rotation of the wheels in one of the two positions and to allow their rotation in the other one of the two positions.

20 Claims, 5 Drawing Sheets

BRAKING DEVICE FOR A SELF-ORIENTATABLE TWIN-WHEEL

BACKGROUND OF THE INVENTION

The present invention relates to a braking device for a self-orientating twin castor.

The so-called twin castors that are mounted on pieces of furniture (tables, chairs, chests of drawers, and so forth) are generally constituted by two wheels provided with axial bushes for rotatably mounting them on a supporting spindle. The spindle is driven through a support which is constituted by a vertical wall that lies between the wheels and by a sort of semicylindrical hood that covers the wheels in an upward region.

A cylindrical recess is formed in the wall and has a vertical axis that is eccentric with respect to the spindle and is open upwardly. Said recess acts as a rotation seat for a self-orientation pivot to be inserted and fixed in an appropriate seat of the piece of furniture on which the castor is to be mounted.

Safety rules very often require castors to be self-braking. For this purpose, said castors are provided with devices that keep the wheels in a constantly braked condition until the user deactivates these devices temporarily. These castors have some hardly negligible drawbacks. First of all, in order to provide the support for self-braking castors it is necessary to provide molds that are different from those of castors that do not have a self-braking device. Secondly, the assembly of self-braking castors is relatively complicated and considerably affects the manufacturing cost.

SUMMARY OF THE INVENTION

The technical aim of the present invention is to provide a braking device that can be associated with a twin castor after said twin castor has been assembled, so that the user can choose to provide the castor with or without a braking device.

This aim is achieved with a braking device for a self-orientating twin castor composed of two wheels which are rotatably mounted at the opposite ends of a spindle that is driven through a seat of a support composed of a vertical wall that lies between said wheels and in which a cylindrical recess is formed with a vertical axis that is eccentric with respect to said spindle, said recess being open in an upward region for the engagement of a pivot for mounting the castor in a piece of furniture; characterized in that it comprises a lever element which can be coupled to said wall so that it can oscillate between two positions about an axis that is parallel to said spindle, said lever element comprising an arm for blocking said wheels, which lies between said wheels, and an actuation arm, which can be accessed by a user, retention means being furthermore provided for retaining said lever element in said positions, said blocking arm being suitable to block the rotation of said wheels in one of said positions and to allow their rotation in the other one of said positions.

BRIEF DESCRIPTION OF THE DRAWINGS

Further particularities of the invention will become apparent from the following description of some embodiments, illustrated only by way of non-limitative example in the accompanying drawings, wherein.

DESCRIPTION OF THE PREFERRED EMBODIMENTS

With reference to FIGS. 1 to 6, the reference numeral 1 designates the support of a self-orientating twin castor which is formed monolithically, for example by molding plastics or metal. The support 1 comprises a substantially semicircular vertical wall 2 on the upper profile whereof there is a semicylindrical hood 3. At the center of the lower edge 4 of the wall 2, and concentrically to the hood 3, there is a bore 5 that acts as a seat for the support of a horizontal spindle 6 which is driven through said seat. A hollow expansion 7 is formed in the wall 2, protrudes above the hood 3, and forms a vertical recess 8 that is eccentric with respect to the spindle 6 and in which a pivot (not shown) is rotatably accommodated; the castor is applied to a piece of furniture by means of said pivot. A respective tubular portion 9 protrudes outwardly concentrically to the hole 5 from each face of the wall 2; arc-like teeth 10 are formed inside said tubular portion and form shoulders 11 which are spaced from the wall 2. Two wheels 12 (only one is shown in the drawing) are rotatably mounted on the opposite ends of the spindle 6 and are sized so as to be covered peripherally by the hood 3. Each wheel 12 comprises a disk 13; a cylindrical ring 14 protrudes from the peripheral region of said disk (with reference to the castor assembly position) towards the wall 2, constitutes the surface for the rolling of the wheel, and is internally provided with a set of teeth which is composed of axial triangular teeth 15. A bush 16 protrudes from the center of the disk 13 again towards the wall 2, is coaxial to the ring 14, and ends with an outer annular flange 17. The regions where the ring 14 and the bush 16 join the disk 13 are reinforced by radial ribs 18 and 19. The wheels 12 are retained axially on the spindle 6 by forcing the insertion of the bushes 16 in the tubular portions 9, so that the flange 17 engages behind the shoulders 11 formed by the teeth 10. An additional retention element which is suitable to ensure greater safety against accidental extraction of the wheels from the spindle is constituted by annular ridges which are located inside the bushes 16 and are arranged so as to engage by forcing in respective annular grooves 20 of the spindle 6. In any case it should be noted that the wheels 12, when mounted on the spindle 6, remain spaced so that their internal edges do not make contact with the expansion 7. A slot 21 (FIG. 6) is formed in the wall 2 on the side located opposite to the expansion 7 with respect to the tubular portions 9 and is open towards the lower edge 4 of the wall 2. The slot 21 is shaped like a circular arc centered substantially on the rounded end or lower edge 22 of the hood 3, which extends below the edge 4 with a small portion 23.

The slot 21 is surrounded by a perimetric expansion 24 and has a protrusion 25 on its inner edge. A tooth 26 is formed below the inlet of the slot 21, on the outside of the tubular portions 9, has a rounded cross-section, and protrudes parallel to the spindle 6 from the opposite faces of the wall 2. A similar tooth 27, having a saw-tooth cross-section, is formed inside the portion 23 of the hood 3 at the corner formed with the edge 4 of the wall 2. The elements 21–27 are part of the braking device according to the invention, which is furthermore formed by a lever element, generally designated by the reference numeral 28 (see FIGS. 1, 4, and 5), which is also produced by molding plastics or metal.

Figure 1:
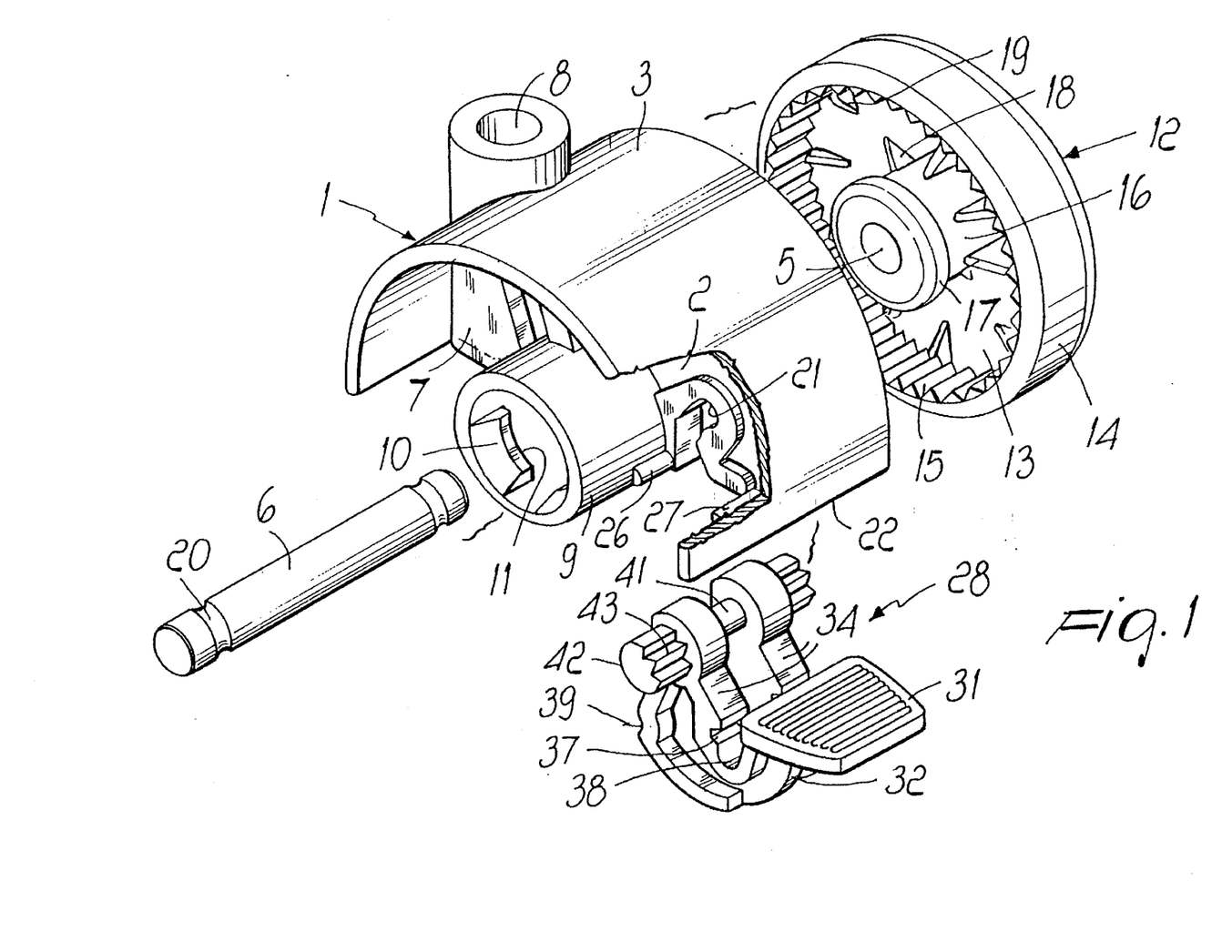
FIG. 1 is an exploded perspective view of a twin castor provided with the braking device according to the present invention.
Figure 2:
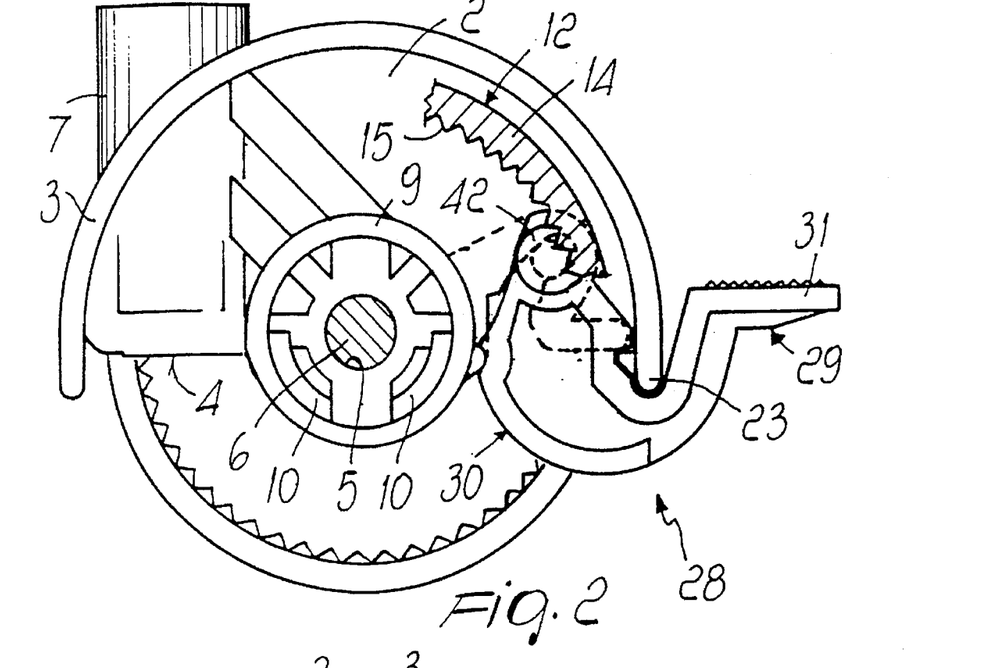
FIGS. 2 and 3 are side views of the twin castor according to FIG. 1, in the locking and release positions respectively.
Figure 3:
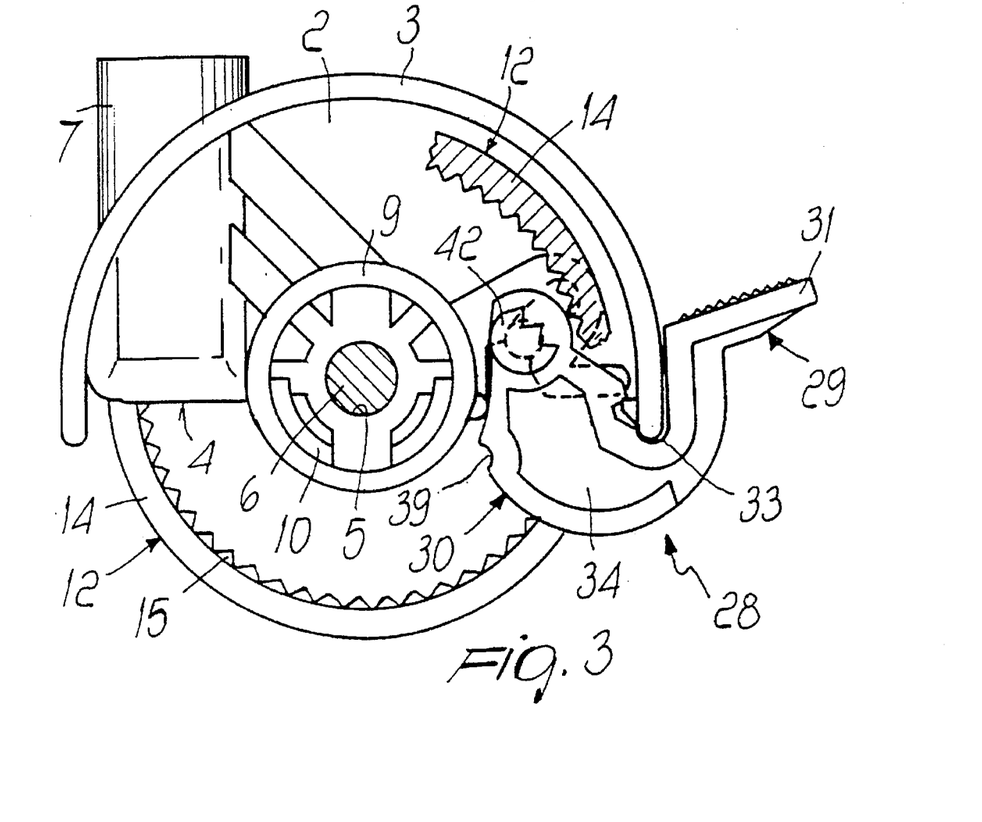
Figure 4:
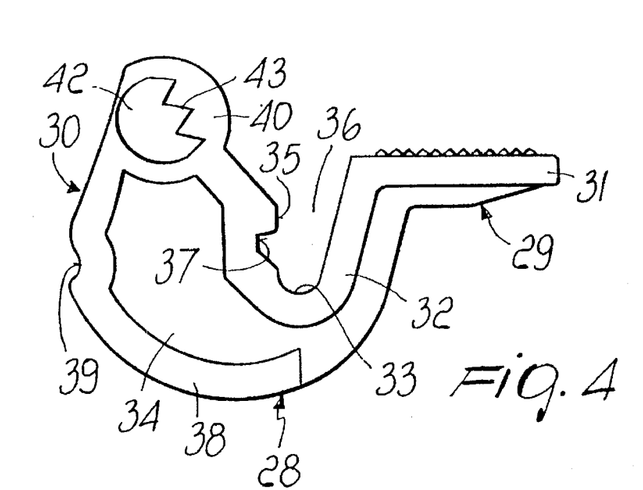
FIGS. 4 and 5 are respectively a side view and a plan view of the blocking arm of the lever element for the twin castor of FIGS. 1–3.
Figure 5:
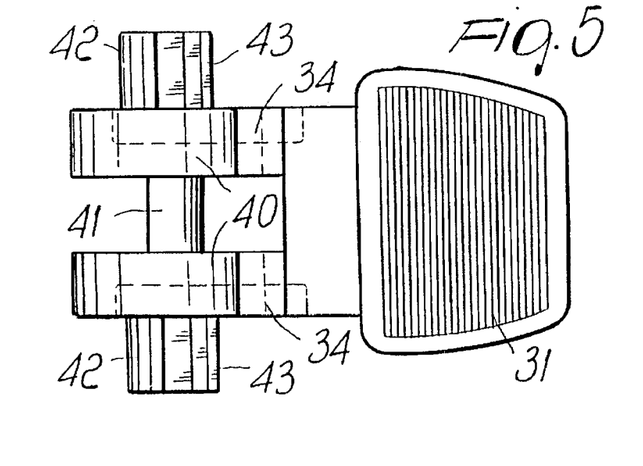
Figure 6:
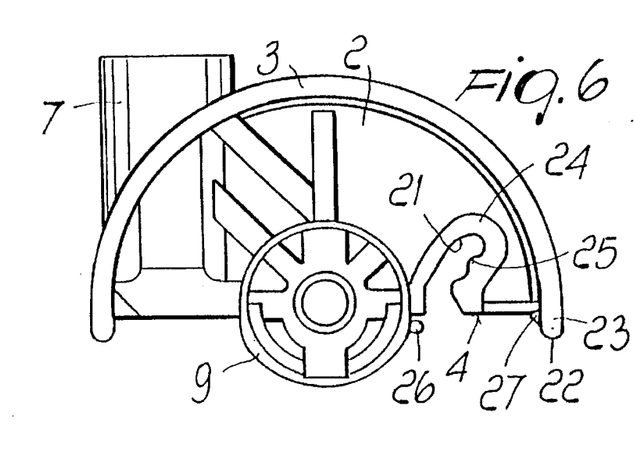
FIG. 6 is a side view of the support of the castor of FIGS. 1–3.
Figure 7:
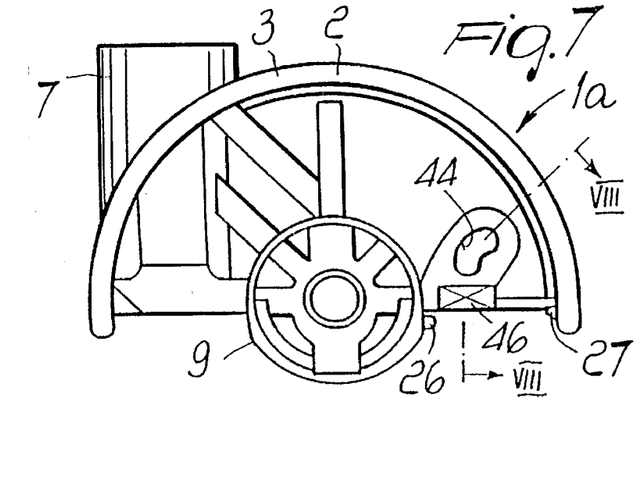
FIG. 7 is a side view of a support for a twin castor according to another embodiment.
Figure 8:
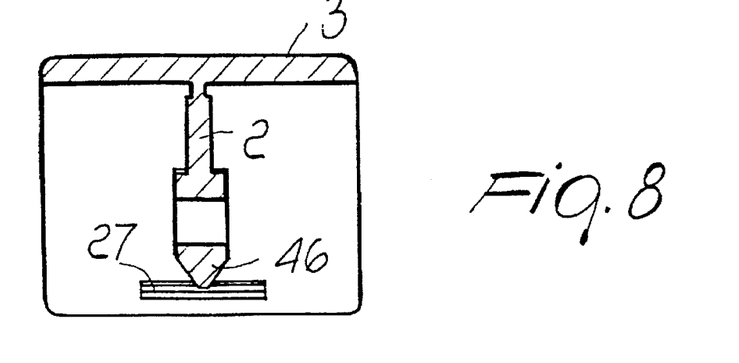
FIG. 8 is a sectional view, taken along the plane VIII—VIII of FIG. 7.

The element 28 comprises an actuation arm 29 and a blocking arm 30 which is connected to the arm 29 so that it can be coupled to the support and can oscillate between a position for blocking the wheels 12 and a position for allowing their free rotation. The arm 29 includes a wing 31 and a portion 32 which are arranged so as to include an obtuse angle. When the lever element 28 is coupled to the support 1 as seen in FIGS. 2 and 3, the actuation arm 29 of the lever element 28 extends from below the lower edge 22 of the semicylindrical hood 3 and the blocking arm 30 of the lever element 28 extends from such lower edge 22 underneath the semicylindrical hood 3, and the wing 31 is substantially radial with respect to the hood 3 and constitutes the pushbutton for actuating the braking device. The portion 32 is tangent to a groove 33 which is shaped complementarily to the end 22 of the hood 3. The center of the oscillation of the lever element 28 is located in the groove 33, as will become apparent hereinafter.

The arm 30 is composed of two flat and parallel plates 34 which form a fork together with the arm 29. The plates 34 have an edge 35 which lies opposite to the portion 32 of the arm 29 and forms, together with said arm, a channel 36 which is open upwards and forms an acute angle in cross-section.

Recesses 37 are formed in the edges 35 of the plates 34 directly above the groove 33 and are shaped complementarily to the tooth 27. As will be described in more detail hereinbelow, the tooth 27 and recesses 37 together form complimentarily shaped elastic projection and recess engagement elements disposed underneath the hood 3 for achieving an elastic snap-together coupling of the lever element 28 with the castor support 1. The inner peripheral edges of the plates 34 have a circular shape and are reinforced by expansions 38 in which notches 39 are formed. Said notches 39 are located at a distance from the groove 33 that is substantially equal to the distance between the teeth 26 and 27. The top portions of the plates 34 form expansions 40 which are mutually connected by a cylindrical rod 41 which diameter is equal to the radial width of the slot 21. The rod 41 is located, with respect to the groove 33, at a distance that is equal to the distance between the slot 21 and the end 22 of the hood 3.

Respective pivots 42 are formed coaxially to the rod 41 but externally with respect to the expansions 40 and have, on a plane that is substantially radial with respect to the groove 33, teeth 43 which are shaped complementarily to the teeth 15 of the wheels 12. Since the arm 30 remains inserted between the pair of wheels 12 when the lever element 28 is mounted in the support 1, the distance between the outer faces of the plates 34 is set so that it is less than the distance between the inner edges of the wheels.

From the above description it is evident that the wheel can be used with or without a braking device.

In the second case, the presence of the slot 21 and of the sets of teeth 15 does not compromise the outward appearance of the castor.

Instead, when one wishes to obtain a wheel that can be braked, the lever element 28 is added.

For this purpose, the end of the blocking arm 30 provided with the expansions 40 is inserted in the space between the wheels 12 while the lever element 28 is kept at right angles to the wall 2. Then, by rotating the lever element 28 into a position at right angles to the spindle and so that the wing 31 arranges itself below the end 22 of the hood, the pivots 42 are inserted below the sets of teeth 15 of the wheels 12.

At this point, after placing the end 22 of the hood 3 in the inlet of the channel 36, and after placing the rod 41 in the inlet of the slot 21, by applying an adequate pressure on the lever element 28 and by utilizing the elasticity of the material the tooth 27 is inserted with a snap-together action in the recesses 37 and the rod 41 is likewise inserted in the slot 21, so that the lever element 28 oscillates about the end 22. By acting downwardly or upwardly on the wing 31, the lever element 28 can assume two stable positions. By pressing on the wing 31, the lever element 28 reaches a first position, shown in FIG. 2, which is the position for blocking the wheels 12; in this position the tooth 26 engages the notch 39 of the plates 34 and the rod 41 engages the bottom of the slot 21 beyond the protrusion 25. The wheels 12 are blocked by the engagement of the teeth 43 between the teeth 15 that lie inside the rolling rings 14.

In the second position, which is shown in FIG. 3 and is the position in which the wheels 12 turn freely, the wing 31 has been raised so as to disengage the tooth 26 from the notch 39 and make the rod 41 pass beyond the protrusion 25. In this position, which is set by the abutment of the portion 32 against the outer wall of the hood 3, the teeth 43 are disengaged from the teeth 15 so that the wheels 12 can rotate freely.

It is evident that since the braking device can be applied at a later time, that is to say after completing the assembly of the castor and without requiring visible modifications thereof to apply it, it allows to provide a single type of support and of wheels, thus providing a considerable saving in setting up the molds and the parts store. There is also a considerable saving in the cost of the assembly, which can be performed by the final user since it is simple.

The described device is susceptible of numerous modifications and variations, all of which are within the scope of the same inventive concept.

FIGS. 7, 8, 12, and 14 illustrate a different embodiment of the support 1a and lever element 28a in which the slot 44 (which corresponds to the slot 21 of the previous example) is closed, and instead of the rod 41 there are two coaxial shanks 45 which protrude from the plates 34 towards each other. In order to facilitate the insertion of the shanks 45 in the slot 44, a wedge 46 (see FIG. 8) is formed in the lower edge of the wall 2, and the shanks 45 have chamfers 47 which flare out towards the wedge 46, so that during the application of the lever element 28a the wedge 46 can move the plates 34 apart and allow the shanks to slide over the sides of the wedge to engage in the slot 44 in a snap-together manner.

Figure 13:
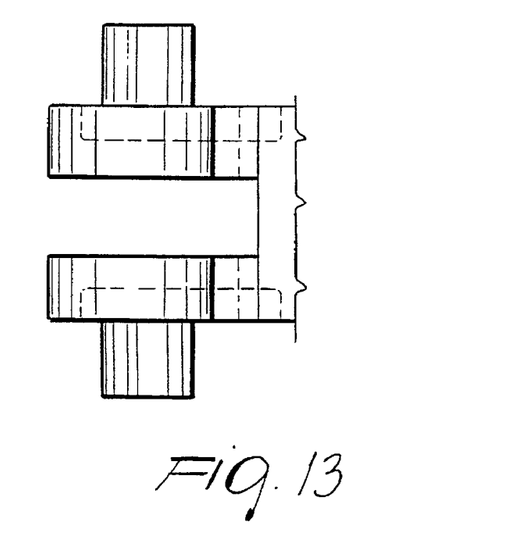
Figure 14:
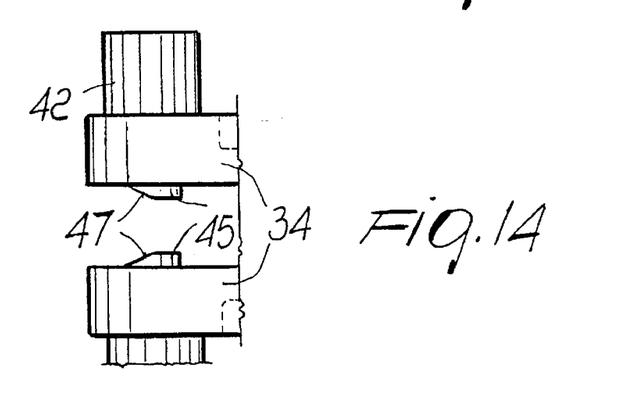
FIG. 14 is a sectional view, taken along the plane XIV—XIV of FIG. 12.

FIG. 13 illustrates a different embodiment of the lever element 28 in which there is no rod or shank between the plates 34.

Actually, the rod 41 or the shanks 45 are not strictly necessary for the operation of the device, since their presence is useful to strengthen the plates 34 and form, together with the protrusion 25, a further blocking element which, together with the engagement of the tooth 26 in the notch 39, increases the safety of the retention of the lever element 28 in the two positions for locking and releasing the castor.

Figure 9:
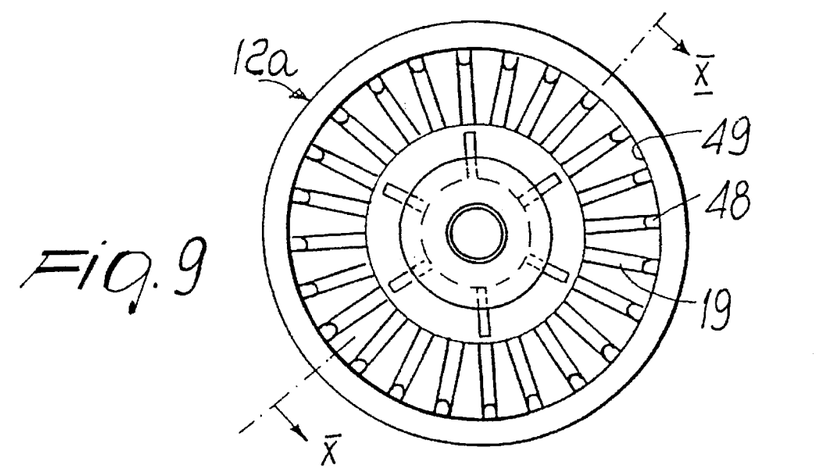
FIG. 9 is a side view of a modified wheel.
Figure 10:
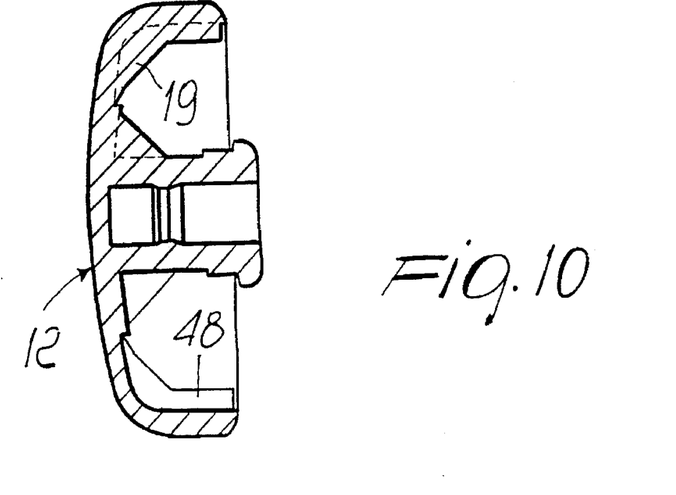
FIG. 10 is a sectional view, taken along the plane X—X of FIG. 9.

FIGS. 9 and 10 illustrate a different embodiment of the wheels 12a in which axial ridges 48 are provided instead of the set of teeth 15 and blend with the radial ribs 19.

Figure 11:
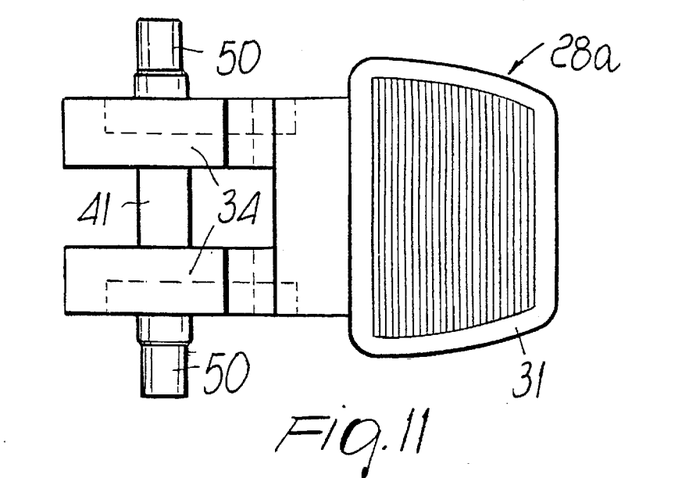
FIG. 11 is a plan view of a different embodiment of the lever element that can be applied to a castor provided with wheels according to FIGS. 9 and 10.
Figure 12:
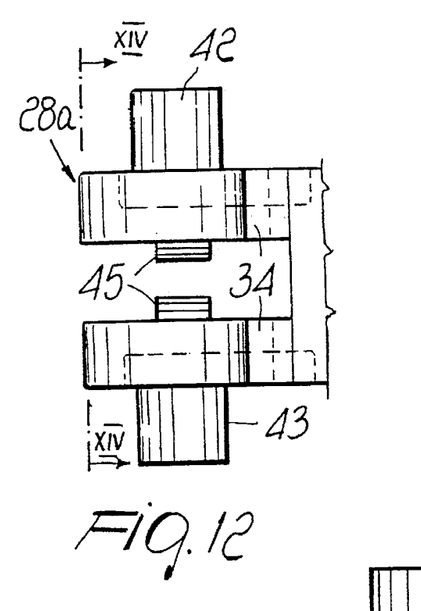
FIGS. 12 and 13 are two partial plan views of two further different embodiments of the lever element; and finally

The ribs 48 are spaced so as to form, between them, recesses 49 in which pivots 50, rigidly coupled to the expansions 40 of lever 28b, can engage. The pivots 50 (see FIG. 11) perform the same functions as the pivots 42 described above with reference to levers 28 and 28a, but differently from said pivots they are cylindrical or shaped complementarily to the recesses 49 so that they can engage in them and prevent the rotation of the wheels 12.

What is claimed is:

1. Braking device for a self-orientating twin castor comprising:
   a spindle;
   two wheels which are rotatably mounted at opposite ends of said spindle;
   a support defining a seat, said spindle being driven through said seat of said support, said support comprising a semicircular vertical wall that lies between said wheels;
   a semicylindrical hood which covers said wheels,
   a cylindrical recess formed in said semicircular wall, said recess having a vertical axis extending eccentrically with respect to said spindle, and said recess being open in an upward region for accommodating a pivot for mounting the castor in a piece of furniture;
   a disk for each wheel of said wheels and a cylindrical ring protruding concentrically from said disk with respect to said spindle towards said wall;
   a lever element of said braking device;
   coupling means for coupling said lever element with said support adjacent one end of said hood such that said lever element is pivotable between two positions about an axis extending parallel to said spindle;
   a blocking arm of said lever element for locking said wheels and extending between said wheels;
   actuation arm of said lever element accessable by a user;
   blocking means of said blocking arm for engaging an inner surface of said ring for said each wheel to block the rotation of said wheels when said lever arm is in one of said two positions and to allow rotation of said wheels when said lever arm is in the other one of said two positions; and
   retention means for retaining said lever element in said two positions for respectively blocking and allowing rotation of said wheels;
   wherein when said lever element is coupled to said support by said coupling means said actuation arm of said lever element extends from below a lower edge of said semicylindrical hood and said blocking arm of said lever element extends from said lower edge underneath said semicylindrical hood; and
   wherein said coupling means comprise an elastic snap-together coupling disposed underneath said semicylindrical hood and including complimentarily shaped elastic projection and recess engagement elements for pivotally connecting said lever element to said castor support after said castor support and said at least one wheel are mutually connected.

2. Device according to claim 1, wherein said coupling means comprise a groove of said lever element defined between said actuation arm and said blocking arm which is engageable with said lower edge of said hood, and wherein said complimentarily shaped elastic projection and recess engagement elements comprise a recess formed above said groove and a tooth extending parallel to said spindle and formed adjacent said lower edge of said hood underneath said hood, said tooth being elastically engageable in said recess.

3. Device according to claim 2, wherein said actuation arm forms an actuation lever, and said blocking arm comprises two flat and parallel plates, said plates lying laterally with respect to said wall respectively between said wall and an inner edge of a respective said cylindrical ring, said blocking means comprising pivots provided at an end of said plates, said pivots extending coaxially and parallel to said spindle and each protruding inside a respective said cylindrical ring, each said cylindrical ring being rigidly associated with a respective one of said wheels, and said pivots being adapted to engage against respectively the inner surface of a respective said cylindrical ring, when said lever element is in said position for blocking the rotation of said wheels.

4. Device according to claim 3, wherein said retention means comprises a further tooth which is rigidly coupled to said support, said further tooth being engageable in a notch of said plates to retain said lever element in said blocking position.

5. Device according to claim 4, wherein said pivots have teeth elements which are engageable between corresponding teeth of a set of teeth formed on the inner surface of each said ring.

6. Device according to claim 4, wherein said pivots engage between ridges formed on the inner surface of each said ring.

7. Device according to claim 4, wherein said retention means further comprises: an open slot, which is formed in said wall and is curved along a path that is centered on an oscillation axis of said lever element; a rod which connects said plates, is driven through said slot, and is engageable with a protrusion formed on an edge of said slot to retain said lever element in the position for blocking said wheels.

8. Device according to claim 4, wherein said retention means further comprises: a closed slot, which is formed in said wall and is shaped like an arc that is centered on an oscillation axis of said lever element; two coaxial shanks, which protrude from opposite faces of said plates, said shanks having chamfers that cooperate with a wedge-shaped portion of an edge of said wall extending below said slot so as to allow a mutual spacing of said plates during mounting of said lever element on said support and thereby allowing insertion of said shanks in said slot.

9. Device according to claim 1, wherein said cylindrical ring forms a rolling surface of each of said wheels.

10. A castor comprising:
    a castor support;
    at least one wheel rotatably supported by said castor support;
    a semicylindrical hood connected to said castor support and at least partially covering said at least one wheel;
    a braking device comprising a lever element pivotally connectable with said castor support;
    a blocking arm of said lever element extending underneath said hood when said lever element is pivotally connected with said castor support and being provided with a blocking mechanism for releasable engagement with said at least one wheel for blocking said at least one wheel from rotating;

an actuation arm of said lever element extending externally with respect to said hood when said lever element is pivotally connected with said castor support for selective actuation of said blocking mechanism; and an elastic snap-together coupling disposed underneath said semicylindrical hood and including complimentarily shaped elastic projection and recess engagement elements for pivotally connecting said lever element to said castor support after said castor support and said at least one wheel are mutually connected; and wherein when said lever element is pivotally coupled to said support by means of said elastic snap-together coupling, said actuation arm of said lever element extends from below a lower edge of said semicylindrical hood and said blocking arm of said lever element extends from said lower edge underneath said semicylindrical hood.

11. The castor of claim 10 further comprising retention means for retaining said lever element in a blocking configuration for blocking said at least one wheel from rotating.

12. The castor of claim 10 further comprising a guiding slot and rod coupling disposed between said blocking arm and said castor support underneath said hood for pivotally coupling said lever element to said castor support.

13. Braking device for a self-orientating twin castor comprising:

a spindle;

two wheels which are rotatably mounted at opposite ends of said spindle;

a support defining a seat, said spindle being driven through said seat of said support, said support comprising a semicircular vertical wall that lies between said wheels;

a semicylindrical hood which covers said wheels, a cylindrical recess formed in said semicircular wall, said recess having a vertical axis extending eccentrically with respect to said spindle, and said recess being open in an upward region for accommodating a pivot for mounting the castor in a piece of furniture;

a disk for each wheel of said wheels and a cylindrical ring protruding concentrically from said disk with respect to said spindle towards said wall;

a lever element of said braking device;

coupling means for coupling said lever element with said support adjacent one end of said hood such that said lever element is pivotable between two positions about an axis extending parallel to said spindle;

a blocking arm of said lever element for locking said wheels and extending between said wheels;

an actuation arm of said lever element accessable by a user;

blocking means of said blocking arm for engaging an inner surface of said ring for said each wheel to block the rotation of said wheels when said lever arm is in one of said two positions and to allow rotation of said wheels when said lever arm is in the other one of said two positions; and retention means for retaining said lever element in said two positions for respectively blocking and allowing rotation of said wheels;

wherein when said lever element is coupled to said support by said coupling means said actuation arm of said lever element extends from below a lower edge of said semicylindrical hood and said blocking arm of said lever element extends from said lower edge underneath said semicylindrical hood; and wherein said coupling means comprise an elastic snap-together coupling disposed underneath said semicylindrical hood and including complimentarily shaped elastic projection and recess engagement elements; and wherein said coupling means comprise a groove of said lever element defined between said actuation arm and said blocking arm which is engageable with said lower edge of said hood, and wherein said complimentarily shaped elastic projection and recess engagement elements comprise a recess formed above said groove and a tooth extending parallel to said spindle and formed adjacent said lower edge of said hood underneath said hood, said tooth being elastically engageable in said recess; and wherein said actuation arm forms an actuation lever, and said blocking arm comprises two flat and parallel plates, said plates lying laterally with respect to said wall respectively between said wall and an inner edge of a respective said cylindrical ring, said blocking means comprising pivots provided at an end of said plates, said pivots extending coaxially and parallel to said spindle and each protruding inside a respective said cylindrical ring, each said cylindrical ring being rigidly associated with a respective one of said wheels, and said pivots being adapted to engage against respectively the inner surface of a respective said cylindrical ring, when said lever element is in said position for blocking the rotation of said wheels; and wherein said retention means comprises a further tooth which is rigidly coupled to said support, said further tooth being engageable in a notch of said plates to retain said lever element in said blocking position.

14. Device according to claim 13, wherein said pivots have teeth elements which are engageable between corresponding teeth of a set of teeth formed on the inner surface of each said ring.

15. Device according to claim 13, wherein said pivots engage between ridges formed on the inner surface of each said ring.

16. Device according to claim 13, wherein said cylindrical ring forms a rolling surface of each of said wheels.

17. Device according to claim 13, wherein said retention means further comprises: an open slot, which is formed in said wall and is curved along a path that is centered on an oscillation axis of said lever element; a rod which connects said plates, is driven through said slot, and is engageable with a protrusion formed on an edge of said slot to retain said lever element in the position for blocking said wheels.

18. Device according to claim 13, wherein said retention means further comprises: a closed slot, which is formed in said wall and is shaped like an arc that is centered on an oscillation axis of said lever element; two coaxial shanks, which protrude from opposite faces of said plates, said shanks having chamfers that cooperate with a wedge-shaped portion of an edge of said wall extending below said slot so as to allow a mutual spacing of said plates during mounting of said lever element on said support and thereby allowing insertion of said shanks in said slot.

19. A castor comprising:

a castor support;

at least one wheel rotatably supported by said castor support;

a semicylindrical hood connected to said castor support and at least partially covering said at least one wheel;

a braking device comprising a lever element pivotally connectable with said castor support;

a blocking arm of said lever element extending underneath said hood when said lever element is pivotally connected with said castor support and being provided with a blocking mechanism for releasable engagement with said at least one wheel for blocking said at least one wheel from rotating;

an actuation arm of said lever element extending externally with respect to said hood when said lever element is pivotally connected with said castor support for selective actuation of said blocking mechanism; and an elastic snap-together coupling disposed underneath said semicylindrical hood and including complimentarily shaped elastic projection and recess engagement elements for pivotally connecting said lever element to said castor support; and wherein when said lever element is pivotally coupled to said support by means of said elastic snap-together coupling, said actuation arm of said lever element extends from below a lower edge of said semicylindrical hood and said blocking arm of said lever element extends from said lower edge underneath said semicylindrical hood; and wherein the castor further comprises a guiding slot and rod coupling disposed between said blocking arm and said castor support underneath said hood for pivotally coupling said lever element to said castor support.

20. The castor of claim 19 further comprising retention means for retaining said lever element in a blocking configuration for blocking said at least one wheel from rotating.

* * * * *